March 21, 1939.  W. S. SAUNDERS ET AL  2,151,156
ADJUSTABLE SEAT SUPPORT
Filed Feb. 21, 1938   2 Sheets-Sheet 1
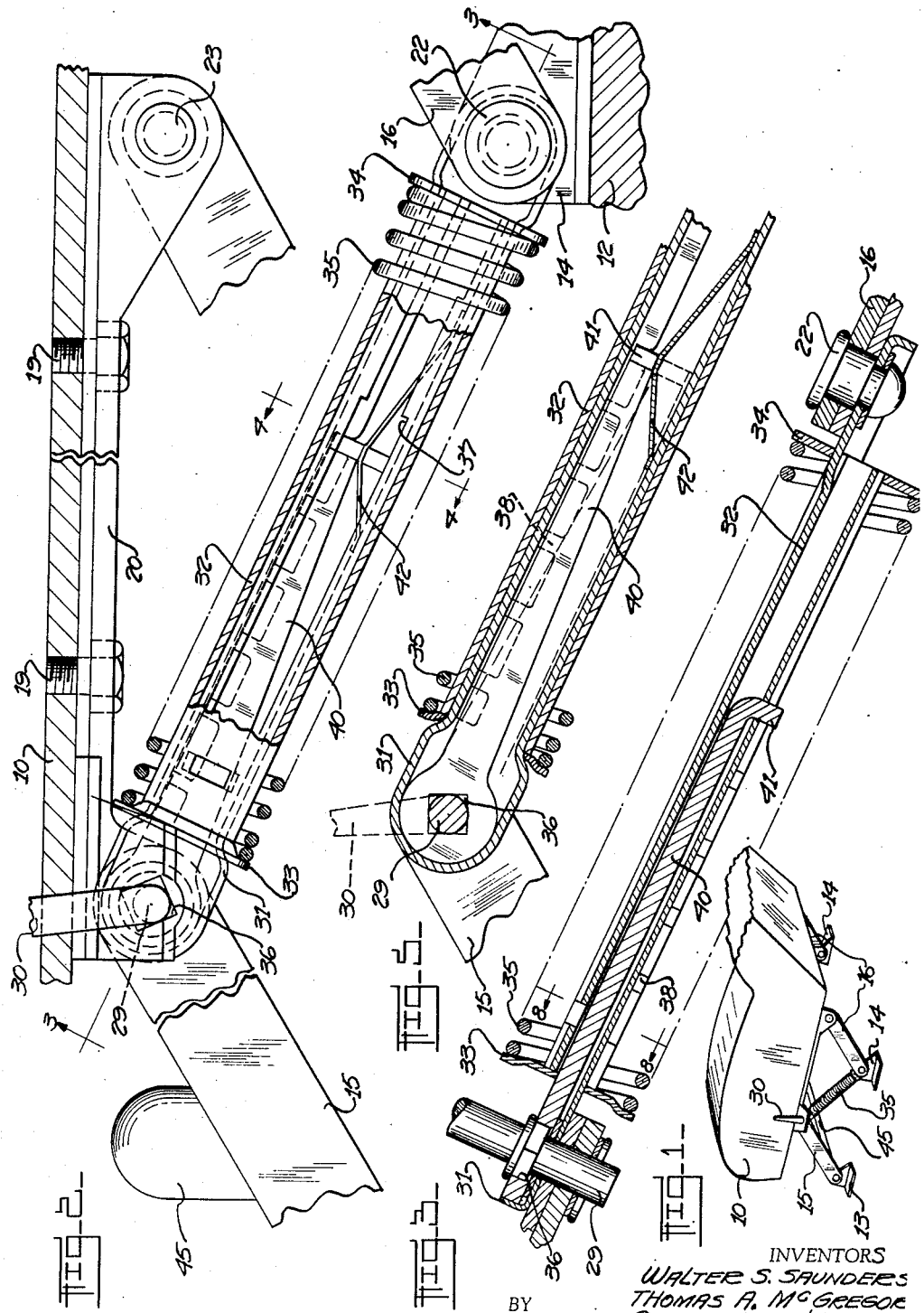
INVENTORS
WALTER S. SAUNDERS
THOMAS A. McGREGOR
BY Swan, Faye Hardisty
ATTORNEYS March 21, 1939.  W. S. SAUNDERS ET AL  2,151,156
ADJUSTABLE SEAT SUPPORT
Filed Feb. 21, 1938    2 Sheets-Sheet 2
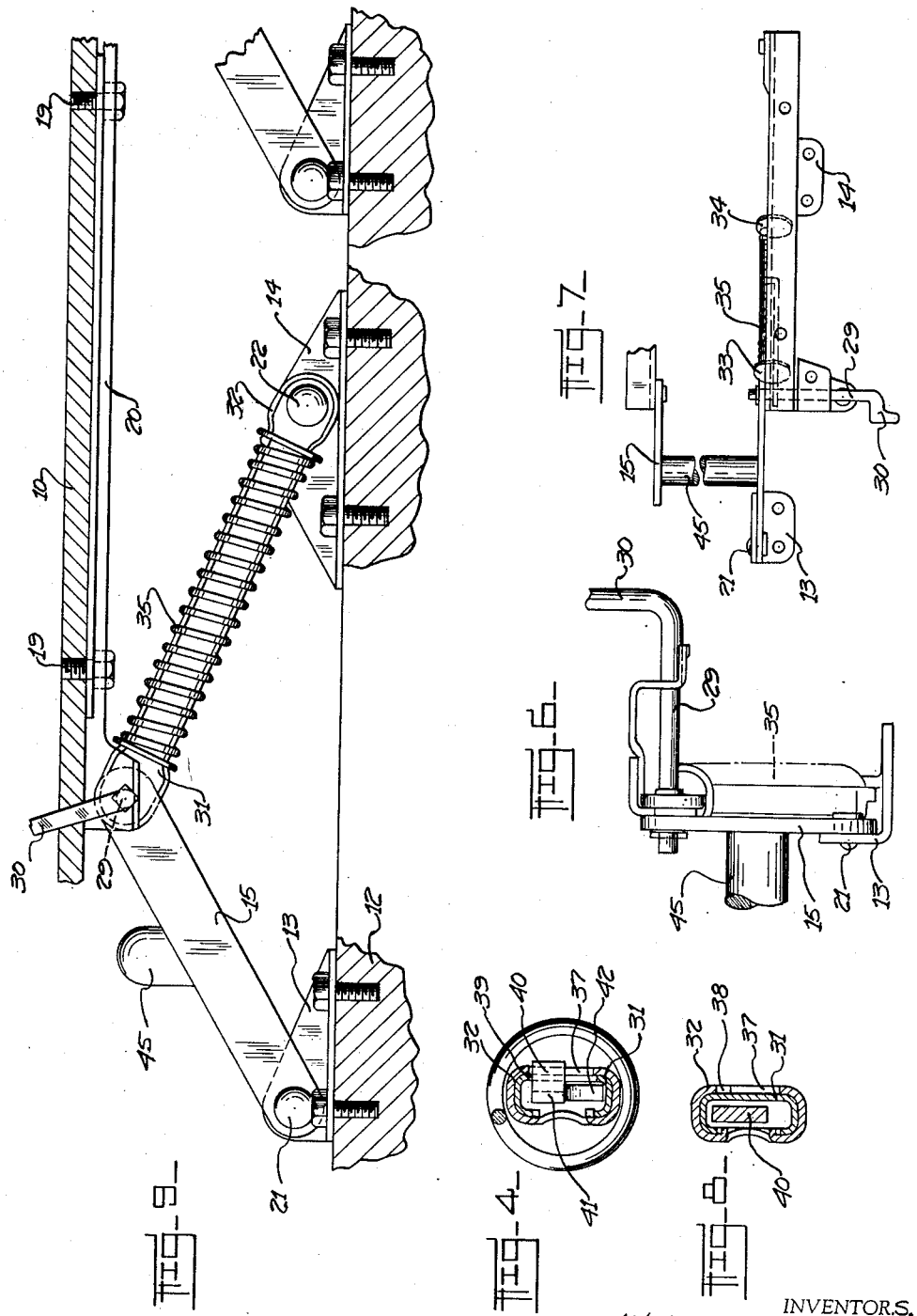
INVENTORS.
WALTER S. SAUNDERS.
THOMAS A. McGREGOR.
BY
ATTORNEYS.

Patented Mar. 21, 1939

2,151,156

UNITED STATES PATENT OFFICE 2,151,156

ADJUSTABLE SEAT SUPPORT

Walter S. Saunders and Thomas A. McGregor, Pontiac, Mich., assignors to American Forging & Socket Company, Pontiac, Mich., a corporation of Michigan Application February 21, 1938, Serial No. 191,660

6 Claims. (Cl. 155—14)

This invention relates to adjustable supports, and particularly to an improved supporting structure for the seats of automobiles and other vehicles.

A primary object of the invention is to provide greatly simplified yet sturdy and easily operable supporting means of the character indicated, which enables adjusting the seat to the most comfortable or convenient position for the occupant, yet rigidly holds it in any set position.

An important object of the invention is also to provide such an adjusting mechanism which allows longitudinal movement of the seat forwardly or backwardly at will, and which simultaneously changes the height of the seat in a desirable manner.

Another object is to incorporate in such a seat supporting mechanism swinging links upon which the seat is mounted and by which it is held to the floor or other support, all tracks, rollers and other portions apt to rattle, or to become jammed or rendered inoperative by foreign matter or rust, being eliminated.

Still another object is to provide such supporting mechanism which is less expensive to manufacture and to install than known types, and which incorporates novel means whereby the weight of the seat and its occupant or occupants may be partly or entirely counterbalanced, facilitating adjustment.

A still further object is to incorporate in such a link-type adjustable seat support improved and simplified latching mechanism, formed as a unit with the aforementioned counterbalancing means, and providing for rigid locking of the seat in any desired position of adjustment.

Other objects and advantages will be apparent from the following description, wherein reference is made to the accompanying drawings illustrating a preferred embodiment of our invention and wherein similar reference numerals designate similar parts throughout the several views.

In the drawings:

Figure 1 is a perspective view of a vehicle seat, partly broken away, showing the same adjustably mounted upon a floor, by supporting mechanism constructed in accordance with the present invention.

Figure 2 is an enlarged side elevational view of the supporting mechanism, partly broken away and showing the adjacent seat and floor portions in section.

Figures 3 and 4 are sectional views taken substantially on the lines 3—3 and 4—4 respectively of Figure 2, and looking in the direction of the arrows.

Figure 5 is a sectional view taken substantially on the lines 5—5 of Figure 3 and looking in the direction of the arrows.

Figure 6 is a front elevational view of one only of the pair of supporting assemblies.

Figure 7 is a plan view, with the cross-connecting torque tube centrally broken away.

Figure 8 is a cross sectional detail taken substantially on the line 8—8 of Figure 3 and looking in the direction of the arrows, and Figure 9 is a side view similar to Figure 2 showing a somewhat modified arrangement.

Referring now to the drawings, reference character 10 designates a vehicle seat, which is adjustably attached to the floor 12 by the mechanism of the invention. The principal supporting means comprises four links, one arranged to support the seat at or near each corner thereof, swingable for adjustment in uniform and parallel relation. The front links are designated 15 and the rear links 16. During their normal movement they are substantially inclined from the vertical, to provide for a desirable adjustment of the height of the seat concurrently with its longitudinal movement. The two links at each end of the seat are mounted as a pair. The two supporting units thus provided for, opposite ends of the seat being similar except for a few particulars which will be noted, description of one such unit will suffice.

The front and rear links are articulated at their upper ends to a common seat mounting rail 20, to which the seat is secured as by bolts 19. At their lower ends the links are pivoted to front and rear floor brackets 13, 14, bolted or otherwise suitably attached to the floor.

The links swing in vertical longitudinal planes so that the seat may move to the front and rear. With the links inclined somewhat toward the rear, as shown, forward movement of the seat also elevates it and vice versa, while with a reverse arrangement and forward inclination of the links, it will be seen that the mechanism would be depressed while moving forward. If the links 15, 16 are of unequal length, the seat may also be given a tilting motion during adjustment.

Simple shouldered rivets as 21, 22 pivotally connect the lower ends of links to the floor brackets, and a similar rivet 23 provides the pivotal connection between the upper end of the link 16 and seat bracket 20. The pivotal connection between the upper end of link 15 and the forward end of the seat bracket, however, is provided by the shaft 29, an integral extension of which extends outwardly and upwardly to form the handle 30.

A control assembly is provided incorporating latching and counterbalancing means and comprising slidably interconnected guides 31, 32, one connected to the seat and the other to the floor. They are shown in the modification of Figures 1 to 3 inclusive as connected to the pivot portions 29, 22, respectively, although this is merely convenient rather than essential. The guide members are of sheet metal, folded to substantially rectangular and tubular form. Each guide member carries near its pivotally attached end a spring abutment 33, 34. A compression spring 35 is arranged upon the assembly and trapped between the abutments to urge the seat forwardly and upwardly, counterbalancing, to any extent desired by the designer, the weight of the seat and its expected load. A handle shaft section in alignment with the interior of the tubular guide members is squared, as indicated at 36, or any other desired or suitable means may be provided for attaching to the handle shaft a latching dog 40, which extends to the interfitting tubes. The dog normally latches the guide tubes against sliding with relation to each other, but is swingable by the handle to free the tubes for relative movement. It will be apparent that when these parts are locked together the seat is rigidly held in position, while when they are released, it may be moved within the limits allowed by the links.

As best shown in Figure 4, the latching member 40 is limitedly swingable within the guide tube assembly in a vertical plane. As also shown in that view, the guide tubes are not of completely enclosed form, being left open along opposite sides. A continuous opening or slot 37 is thus formed in the outer tube, such slot having its upper edge notched, as indicated at 38, to receive the swingable end 41 of the dog 40, which is turned outwardly through a vertical slot 39 in the wall of the inner tube 31 for movement into and out of engagement with such notches. By virtue of this arrangement, it will be seen that when the outturned end 41 of the dog 40 is in the upper position, in which it is normally yieldably held by a spring 42 arranged therebeneath, its engagement in one of the notches 38 locks the tubes 31, 32 against relative movement thereby preventing swinging of the links 15, 16, and rigidly holding the seat in position. When the handle 30 is moved to swing the dog 40 downwardly, however, to free its end 41 from the notches 38, the tubes 31, 32 may slide within one another to allow adjustment of the seat. If the springs 35 are strong enough to somewhat more than counterbalance the weight of the seat, it is only necessary for the occupant to rise after releasing the latch, to allow the seat to come upwardly and forwardly, while on the other hand putting sufficient load upon the seat pushes it downwardly and to the rear when the latch is released.

It will be apparent that the latching dog 40 may be omitted from the assembly at one end of the seat, or that the shaft portion of handle 30 may be extended across the seat to operate the latching dog of the other unit if it is desired to use them in both units. If the latching means is provided in one unit only, relatively rigid torsion-resisting cross connecting means such as the tube 45 is provided, connecting the front links of the units at opposite ends of the seat. By forcing such links to move in unison, uniform movement of the two ends of the seat is insured.

What we claim is:

1. Supporting means for a seat or the like, comprising a plurality of links arranged to swing in a substantially parallel plane and adapted at their lower ends to be pivotally attached to a suitable support and at their upper ends to be pivotally attached to suitable means for supporting a desired object, and means for releasably holding the last mentioned means in any of a plurality of positions of adjustment, comprising slidably interfitted portions one of which is articulated to said support and the other to said means for supporting a desired object, spring means encircling said slidably interfitted portions and urging one in a predetermined direction with respect to the other, and latching means enclosed at least partly within said interfitted portions for releasably holding one with relation to the other in any of a plurality of different positions.

2. An assembly for controlling movement of a device supported for movement in two planes, comprising a pair of guide members having slidably overlapping portions, pivot means for connecting the outer end of one of said guide members to a support, pivot means for connecting the outer end of the other guide member to a supported object, a latch member carried by and extending longitudinally of one of said members and projectable to and retractible from a blocking position with respect to the other to hold said members in any of a plurality of relative positions, and means for operating said latch member including an operating element connected to the latch member and extending from one end of said assembly.

3. An assembly for controlling movement of a device supported for movement in two planes, comprising a pair of guide members slidably interfitted with each other and forming a substantially tubular structure, pivot means for connecting the outer end of one of said members to a support, pivot means for connecting the outer end of the other of said members to a supported object, latching means housed at least partly within said tubular structure for releasably holding said members in any of a plurality of relative positions, spring means encircling said assembly and urging said members in a desired direction with respect to each other, and means extending from said assembly substantially at one end thereof for operating said latching means.

4. Means as set forth in claim 3 in which said last mentioned operating means is arranged substantially coaxially with one of said pivot means.

5. Means as set forth in claim 3 in which said last mentioned operating means comprises a rockable handle carried by a shaft portion which forms one of said pivot means.

6. Means as set forth in claim 2 in which said guide members are of substantially tubular slidably interfitted form, said latch member being housed within the inner member and projectable therethrough into engagement with the outer member.

WALTER S. SAUNDERS.
THOMAS A. McGREGOR.